INVENTORS
E. Spingies & H. Rose
By Lowry & Rinehart
ATTYS.

INVENTORS
E. Spingies & H. Rose
BY Lowry & Rinehart
ATTYS.

ELECTRONIC COMPUTER FOR ADDITION, SUBTRACTION, MULTIPLICATION AND DIVISION IN THE DECIMAL SYSTEM
Filed July 29, 1958 9 Sheets-Sheet 3

INVENTORS
E. Spingies & H. Rose
By Lowry & Rinehart
ATTYS.

INVENTORS
E. Spingies & H. Rose
BY Lowry & Rinehart
ATTYS.

INVENTORS
E. Spingies & H. Rose
BY Lowry & Rinehart
ATTYS.

INVENTORS
E. Spingies & H. Rose
BY Lowry & Rinehart
ATTYS.

April 24, 1962 E. SPINGIES ETAL 3,031,139

ELECTRONIC COMPUTER FOR ADDITION, SUBTRACTION, MULTIPLICATION AND DIVISION IN THE DECIMAL SYSTEM

Filed July 29, 1958 9 Sheets-Sheet 7

INVENTORS

E. Spingies & H. Rose

Lowry & Rinehart

ATTYS.

INVENTORS
E. Spingies & H. Rose
BY Lowry & Rinehart
ATTYS.

INVENTORS
ERWIN SPINGIES &
HERBERT ROSE
BY Lowry & Rinehart
ATTORNEY 3,031,139

ELECTRONIC COMPUTER FOR ADDITION, SUBTRACTION, MULTIPLICATION AND DIVISION IN THE DECIMAL SYSTEM

Erwin Spingies, 31 Bullskamp, Hamburg-Farmsen, Germany, and Herbert Rose, 9 Eichenallee, Wohltorf, Lauenburg, Germany Filed July 29, 1958, Ser. No. 751,716
Claims priority, application Germany Aug. 3, 1957
2 Claims. (Cl. 235—160)

The invention relates to computers, and more specifically to an electronic computer particularly for decimal calculation by means of counting circuits, e.g. counter tubes, which can be utilized for controlling ordinary commercial calculating machines. The computer of this invention is simple, handy and cheap and intended to eliminate the want of suitable apparatus ranging between mechanical calculating machines and large electronic computers.

The known electronic computers, which operate according to the binary system with very high calculating speeds, are very expensive and require a considerable amount of space due to the large number of tubes or transistors and their associated switching and storage means. These computers are capable of giving results in a few microseconds and are therefore chiefly used in extensive calculating departments of large concerns or in control stations of military posts, e.g. rocket control, projectile control and so forth. The costs of such computers are so high that they cannot be borne by small or medium sized undertakings.

Computers with decimal counter tubes which can carry out additions and subtractions in a simple manner are also known. For multiplications and divisions, however, additional multivibrator stages and counter tubes are required, making these computers very expensive since twice the number of counter tubes is required for carrying out multiplications and divisions, too.

An object of the present invention is to provide an electronic computer with simple circuit arrangement, which can be used for hand and remote operation, is cheap to purchase and in which the timing of the calculating operation is such that the computer may be readily adapted for control by ordinary commercial calculating machines for recording and calculating procedures and the like.

Another object of the invention is to provide an electronic computer which is suitable for the four basic kinds of calculation and allows several digit places of a calculation value to be introduced and calculated at the same time.

These objects of the invention are attained by providing an impulse transmitter common to all digit places, which, for example, in the case of decimal calculation, consists of ten impulse-retarded univibrator stages arranged successively in closed circuit arrangement, the tenth stage being controllable as gate in such a manner that the closed circuit arrangement can be interrupted after the ninth or before the first stage, and which further has decoupling members to which keys adjustable to a calculation value or remote controlled switching mechanisms can be connected. The keys have contact means and the switching mechanisms, e.g. step-by-step switching mechanisms, have wiper contact arms connected with the inputs of computing circuit arrangements, e.g. counter tubes, via switching means for a digit place shifting arrangement, the impulse formation and the charging-over to positive or negative calculation.

In addition and substraction the operation of the impulse transmitter is initiated by an impulse with simultaneous switching on of the first place shifting member. In the case of subtraction a change over to negative calculation is also carried out. In the case of multiplication the result is introduced into a totalizing unit, each digit place in succession, by a number of impulses corresponding to the second factor, at the same time always switching on the place shifting arrangement.

In the case of division the tenth univibrator stage of the impulse transmitter is controlled as gate switch in such a manner that the impulse transmitter, after being released, can operate as multivibrator over the nine stages in closed circuit arrangement. As the division takes place by continuous subtraction with simultaneous consideration of the place shift, the number of release impulses on the first univibrator stage is indicated in a quotient counter as result. The computing circuit arrangement which is required as totalizing unit for addition, subtraction and multiplication, serves in the case of division as number accumulator from which the divisor is deducted by subtraction. It is also possible to arrange the totalizing unit so that it can be split so that the quotient calculation will be performed in a part of the totalizing unit and a separate quotient counter can be dispensed with.

The place shifting arrangement and the changing over arrangement are formed by a number of diodes for each numerical place. The diodes are each connected to following switching elements through a coupling condenser. They are controllable each via a resistance and a tube control for each numerical place so that, in the event of drop in potential on the resistance, the impulses will be passed on to the said switching elements.

The decoupling members of the impulse transmitter consist of a chain of series-connected diodes, between the individual links of which taps are provided for picking up the impulses corresponding to the digit values in common for all calculation value places.

It is self-evident that the number storing circuit arrangements which consist chiefly of decimal counter tubes, can be followed by other number accumulators so as to retain individual results for use in subsequent calculating operations.

The computed values are visually displayed. They can, however, also be introduced electronically into ordinary commercial calculating machines by photo-resistances for the purposes of remote control.

The computer according to the invention can be arranged in a similar manner for a twelve digit system.

A preferred embodiment of the invention, employing the decimal calculation system and ten digit places, is illustrated diagrammatically by way of example in the accompanying drawings in which.

FIGS. 2 to 8 should be placed together along the respective vertical lines I—I to VI—VI so that the seven sheets form together a single diagram.

Figure 1:
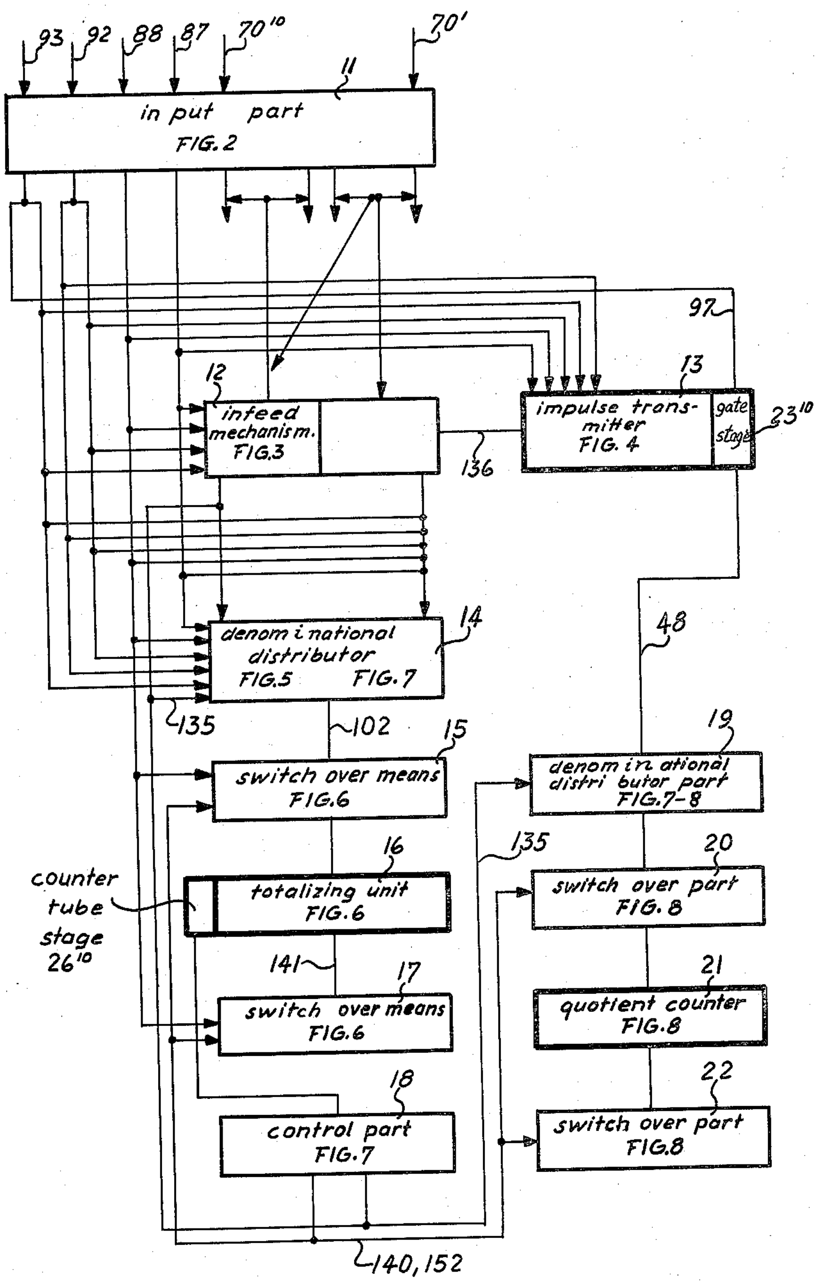
FIG. 1 is a unit-type connecting diagram illustrating the general layout of an electronic computer according to the invention.

According to FIG. 1, an electronic computer consists of an input part 11, a feed-in mechanism 12 capable of being split, an impulse transmitter 13, place shifting means 14 with associated impulse forming stages, switch-over means 15 for positive and negative calculation, a totalizing unit 16, switch-over means 17 for positive or negative tens-transfer in the totalizing unit 16, and finally of a control part 18 necessary in the case of division for the place shifting means 14 and the means 15 and 17 for positive and negative calculation. For carrying out divisions, there is provided a place shifting part 19 associated with impulse forming stages and a switch-over part 20 for positive and negative calculation of a quotient counter 21, and also with a switch-over part 22 for positive or negative tens-transfer in the quotient counter 21.

The input part 11 consists of a series of switching elements, such as relays 34, 36 to 38, and 40 to 44, which can retransmit in a known manner by a switching system to the feed-in mechanism 12 for calculation, electrically represented figures, either in their entirety or split up, simultaneously or successively, or also as exchangeable factors. The value transmission is effected by voltage potentials, as it has become known by applicants' French Patent 1,149,232, FIG. 4, or by U.S. Patent 2,542,998. Each numerical value is represented by a predetermined voltage, e.g. value 1=6 volts, value 2=12 volts, value 3=18 volts etc. Like digits in the decimals (denominations) have like voltage potentials. The introduction of a value is effected thereby that the numerical value introduced as voltage through the input leads 70 arrives via the contacts 71 of the relay 72, the contacts 73 of the relay 74 after response of the relays 72 and 74 as well as via the contacts 75 of the relay 43 and the contacts 76 of the relay 57 at the first relay 55' and then at the wiper contact arm 78' of the contact bank 79'.

Applied to the contacts of the contact bank 79' are the voltage potentials 112 for the numerical values 0 to 9 of a voltage source 113. The relay 55 connects via contact 77' the relay 80' causing via contact 81' the first switching mechanism or selector 25' to run. On starting, the contact 82 opens and the relay 80 becomes currentless. The relay 80 then intermittently responds again until the wiper contact arm 78' has reached the contact on the contact bank 79' having the same voltage potential as the introduced numerical value. Then the relay 55' becomes currentless and the selector 25' stops.

Also for carrying out calculations in accordance with control signals introduced, the relays 34, 36, 37 and 41 serve to control the feed-in mechanism 12, the transmitter 13, the place shifting means 14 and the means 15 and 17.

Figure 4:
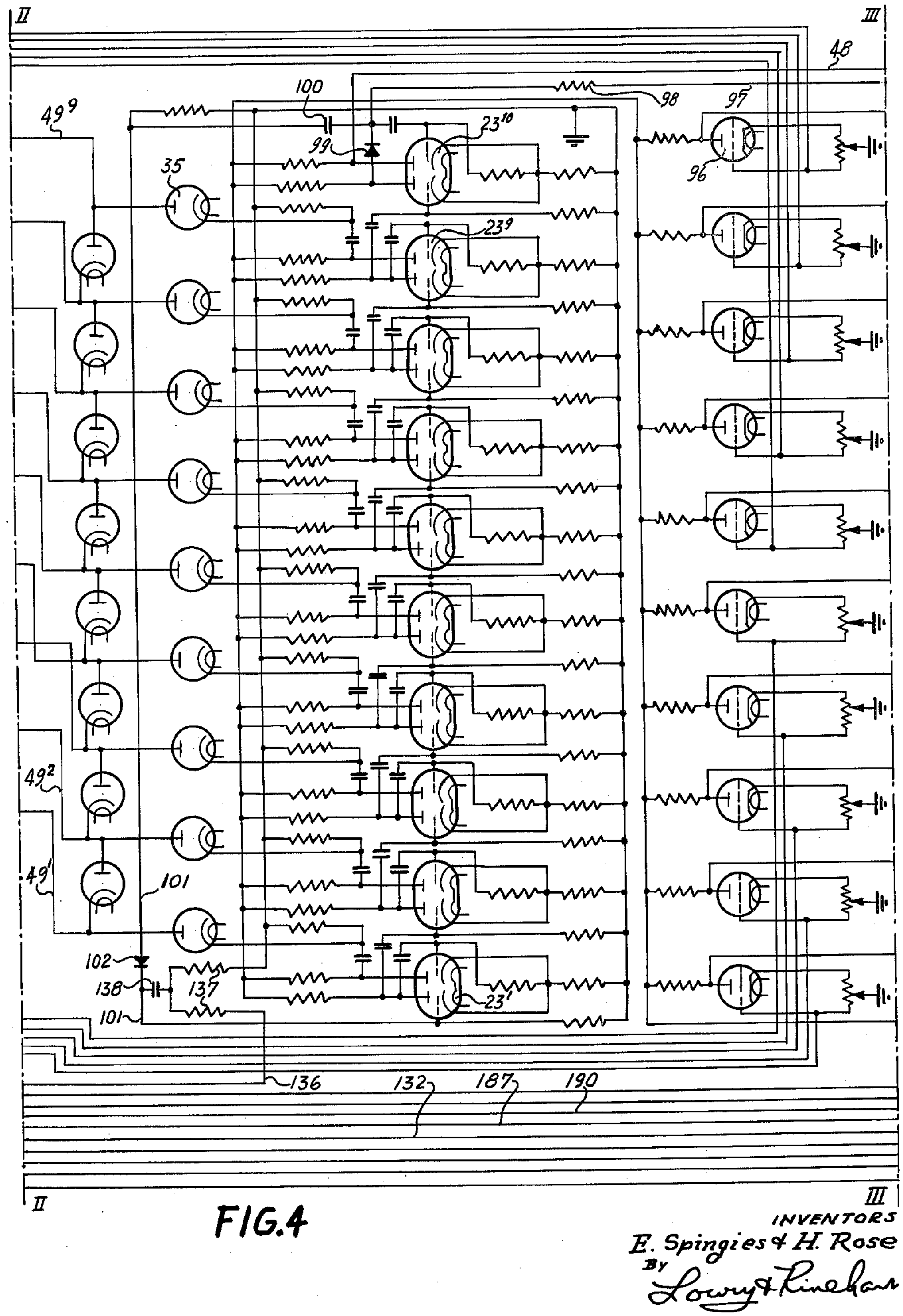
FIG. 4 is a circuit diagram of the impulse transmitter of the computer with a value pick-up means.
Figure 5:
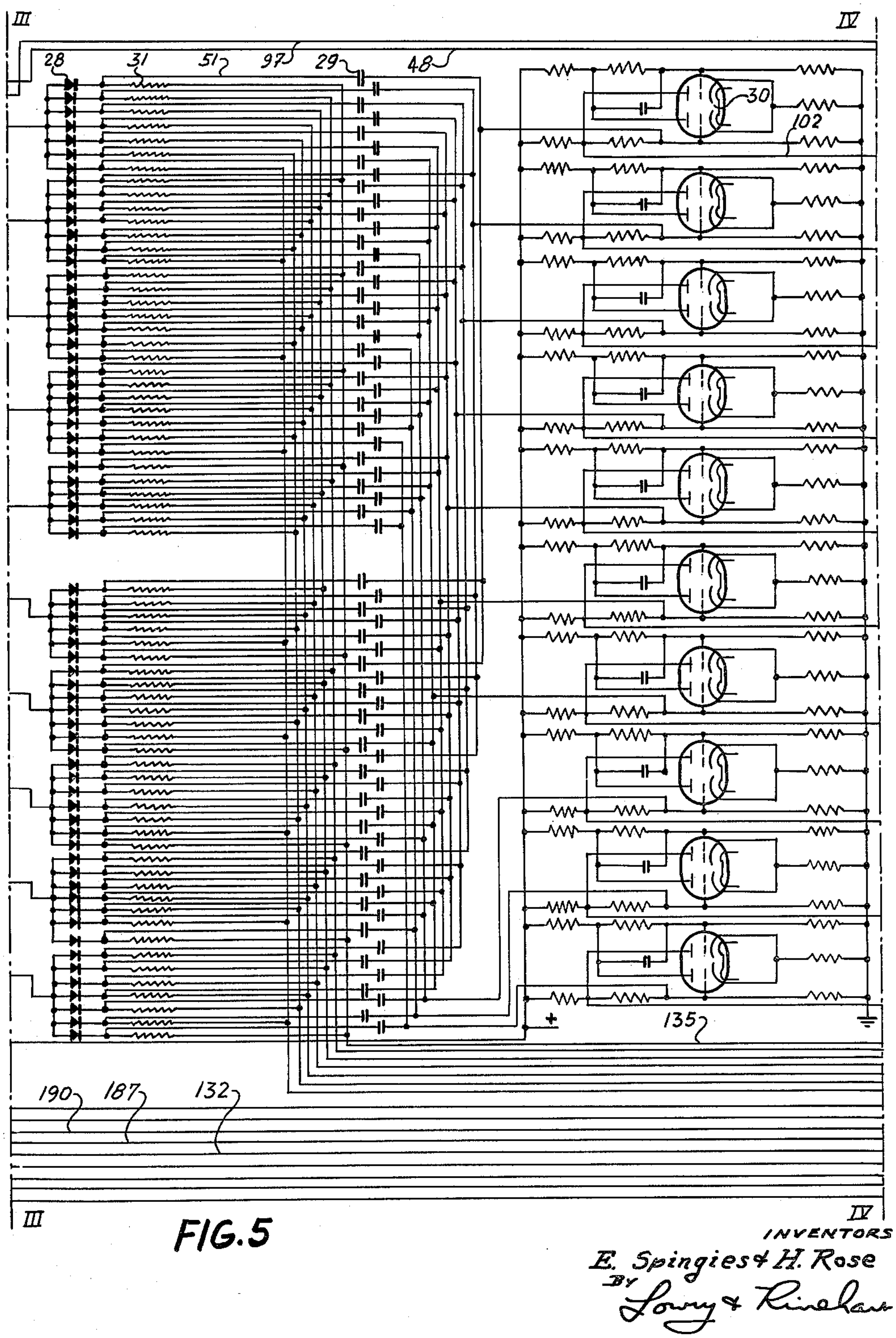
FIG. 5 is a circuit diagram of place shifting means with impulse forming stages.

The feed-in mechanism 12, capable of being split up for carrying out multiplication or division, is formed by a series of switching mechanisms 25 (FIG. 3) which correspond in number to the greatest number of digits to be dealt with and which pick up from the transmitter 13 the number of impulses corresponding to the numerical value by means of wiper contact arms 24 (FIG. 4) in a known manner and transmit them to the place shifting means 14 (FIG. 5). To the feed-in mechanism the relays 83 for addition, 84 for subtraction, 85 for the supervision of the running in of the selectors 25 and the relay 86 for the supervision of the running in of the division. Relays 83 and 84 are controlled via plug connection leads 87 and 88 by keys. Relay 85 is controlled by the contacts 77 of the relays 55 and via diodes 89. Relay 86 is controlled by the contact 90 via the diode 91. Plug connection leads 92 and 93 serve for the initiation of the multiplication via the relay 37 and of the division via the relay 41. For the clearing of the totalizing units 16 and 21 the relay 49 is controlled via the plug connection 94. For the clearing of the input part 11 and the feed-in mechanism 12 the relay 50 is controlled via the plug connection 95. The feed-in mechanism 12 transmits the values from the impulse transmitter 13 via the wiper contact arm 24 of the selector 25 to the place shifting means 14 (denominational distributor) (FIG. 5) via an amplifier stage 96.

The transmitter 13 has ten impulse-retarded univibrator stages $23^1$–$23^{10}$ arranged one behind the other in closed circuit arrangement. The operation of the univibrator stages is known in the literature, see "Die Technik der Impulserzeugung, by Goldammer, in technical journal "Elektronik" 1954, volume 6, pages 45 and 46. The univibrator stages operate according to the principle of time-delay with adjustable duration of the impulse from the front flank to the rear flank. According to the invention this property is utilized for the propagation of the impulses, the rear flank of the impulse of one univibrator stage energizing the following univibrator stage. Thus, by one control impulse many time-delayed impulses can be produced, as univibrator stages $23^1$–$23^{10}$ (FIG. 9) are connected one after another. The time-delayed impulses are picked up from the anodes of the univibrator stages via diodes 35 serving as decoupling members and are serially connected one after another via a further chain of diodes, so that one impulse can be taken from at a nodal point 49', two impulses at a nodal point $49^2$ and nine impulses at a nodal point $49^9$, for calculation at the wiper contact arms 24 of the selectors $25^1$–$25^{10}$.

The impulses picked up from the univibrator stages are converted in a known impulse-forming stage into rectangular impulses for the modulation of counter tube stages $26^1$–$26^{10}$.

In the case of division a flip-flop stage is used for the control of the switch-over means 15 for positive and negative value transmission and for the place shifting. This flip-flop stage is described in the technical journal "Elektronik" article, too. The univibrator stage $23^{10}$ is connected up as gate by applying a high potential from the anode of the locked tube 46 via the lead 97 (FIGS. 4 to 7) and the resistance 98 to the diode 99, so that no impulse can be picked up from the anode of the first tube system of the univibrator stage $23^{10}$, so that the closed circuit arrangement can be interrupted after the ninth and before the first stage. The gate is switched, only in the case of division, by a flip-flop stage 45 which follows a counter tube $26^{10}$ (FIG. 6) for the highest number of digits and which also controls the place shifting and the switching over for positive and negative counting impulses. On opening the gate a starting control impulse, generated by the sudden drop in potential in the lead 97 when $23^{10}$ is opened causing a voltage surge at the capacitor 100, via lead 101 and diode 102, and at the grid of $23^1$ to produce a time-delayed impulse 62 (FIG. 9) which is at the same time transmitted to the univibrator stage $23^1$ of the closed circuit arrangement. The ten stages then produce time-delayed impulses after the provocation of the first stage until the flip-flop stage 45 throws over as the electron beam in the commercial decimal counter tube 26 passes from 0 to 9, the gate closes and the connected up means 15 and 17 each of which comprises one switching unit closed in sequence for each decimal, are switched to positive value transmission. For positive value transmission to the totalizing unit, each unit possesses a differentiating member 103 consisting of condenser and resistance, two diodes 104 for the negative cutting off of impulses and the coupling member 105 consisting of condenser and resistance. For negative value transmission, there exist an integrating member 106 consisting of two condensers and resistance, a series-connected differentiating member 107, two diodes 108 for the positive cutting off of impulses and a coupling member 109 consisting of condenser and resistance. A preset diode having a resistance 110 and a preset diode having a resistance 111 is connected with each switching unit. The resistances 110 and 111 are alternately supplied with voltage from the tube stage 33. The dead resistance 110 or 111 permits the impulse from the lead 102 to pass. These aforementioned reference numerals have been given only in connection with the switch-over means 15. Similarly, these parts are provided for in the case of the switch-over means 17. The impulse produced at this switch-over operation again starts up the impulse transmitter 13 and causes the divisor value deducted too much to be added once with unaltered place shift.

As the electron beam passes from 9 to 0 the flip-flop stage 45 is again energized and as a result opens the gate while at the same time the place shift to the next lower value is effected via flip-flop stages $\mathbf{47^1}$ to $\mathbf{47^5}$ and the switch-over is set to receive negative impulses. This operation is repeated until the last place shift has been reached and a plate voltage cut-off tube 27 (FIG. 7) for the flip-flop stages 45 and $\mathbf{47^1}$ to $\mathbf{47^5}$ and a following stage $\mathbf{46^6}$ responds and thereby electrically switches off the division.

The place shifting means 14 (FIG. 5) are formed by a number of diodes 28 per numerical place which can be connected each by a coupling condenser 29 to following impulse forming stages 30 and by a resistance 31 and a tube control 32 (FIG. 7) controllable for each numerical place to the plate supply voltage. By this measure only channels 51 arranged to lead to the impulse forming stages 30 which are not connected up to the plate supply voltage are opened each time. The impulse forming stages are connected as shown in "Schaltungsbuch der Industriellen Elektronik," 1955, by Dr. Kretzmann, in Verlag für Radio-Foto-Kinotechnik G.m.b.H. Berlin-Borsigwalde, page 53.

The switch-over means 15 and 17 use the same switching arrangements as the place shifting means 14 for allowing the passage of positive or negative counting impulses. Also in this case diodes connected up to the computing input of the totalizing unit 16 by means of differentiating members, are alternately connected to the plate supply voltage by each a resistance and by a switchable tube stage 33. The branch not connected to the plate supply voltage allows the impulses to be counted to pass to the totalizing unit 16. The totalizing unit has been described in the information sheet IJ1 issued in January 1956 by Valvo-Röhrenwerke, Hamburg.

The totalizing unit 16 has counter tube stages 26 which are connected up in a usual manner for receiving positive or negative counting impulses.

The negative place shifting necessary in the case of division and also the control necessary for carrying out the negative or positive tens-transfer are effected in the control part 18 by the flip-flop stages 45, $\mathbf{47^1}$ to $\mathbf{47^5}$ connected up in series as described in the technical journal "Elektronik," 1954, No. 6, pages 45 and 46, FIGS. 16–18.

The place shifting part 19, which is the same as that shown in FIG. 5, and also the switch-over parts 20 and 22, which are the same as the switch-over means 15 and 17, are built up like the place shifting means 14 or the switch-over means 15 and 17. The circuit arrangement differs only in that the place shifting part 19 commences with the highest numerical place and that the switch-over parts 20 and 22 operate conversely to the switch-over means 15 and 17.

The quotient counter 21 (FIG. 8) corresponds in construction with the totalizing unit 16, which is described in the information sheet IJ1, of Valvo-Röhrenwerke, January 1956.

For clearing the computer, relays 49 and 50 are provided in the input part 11. The relay 49 clears the electronically stored values in the totalizing unit 16 and in the quotient counter 21. The relay 50 clears the switching mechanisms 25 in the in-feed mechanism 12 after division has taken place.

Figure 3:
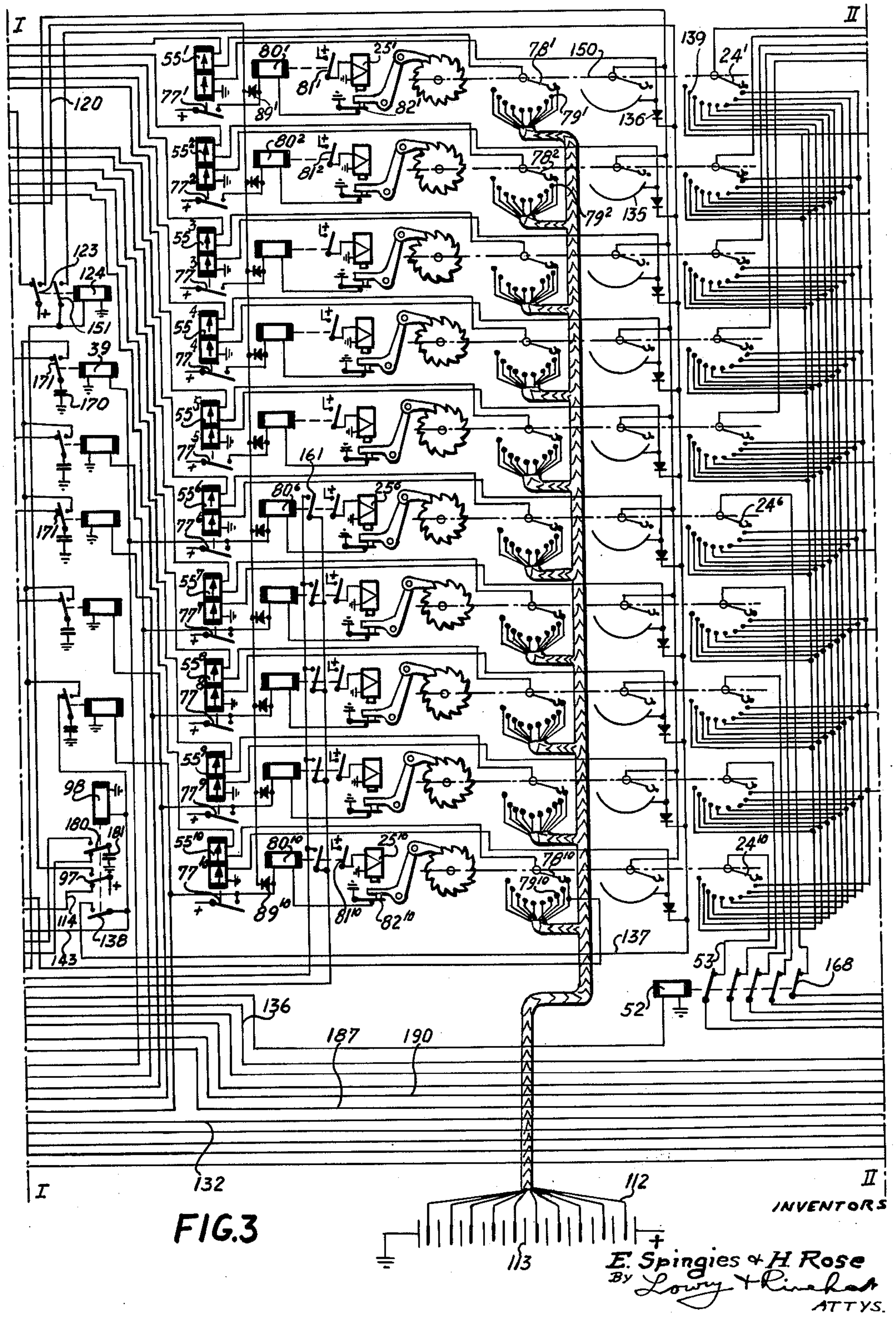
FIG. 3 is a circuit diagram of the feed-in mechanism thereof.

The numerical values for the electronic computer are represented by ten different voltages 112 which are tapped from a source of current 113 (FIG. 3). The voltage for like numerical values of all decimals have like values. For clarity and simplicity, the negative lead is shown in the drawings grounded and the positive lead is identified by a plus sign.

The carrying out of the four basic types of calculation is hereinafter described:

*Addition*

Figure 6:
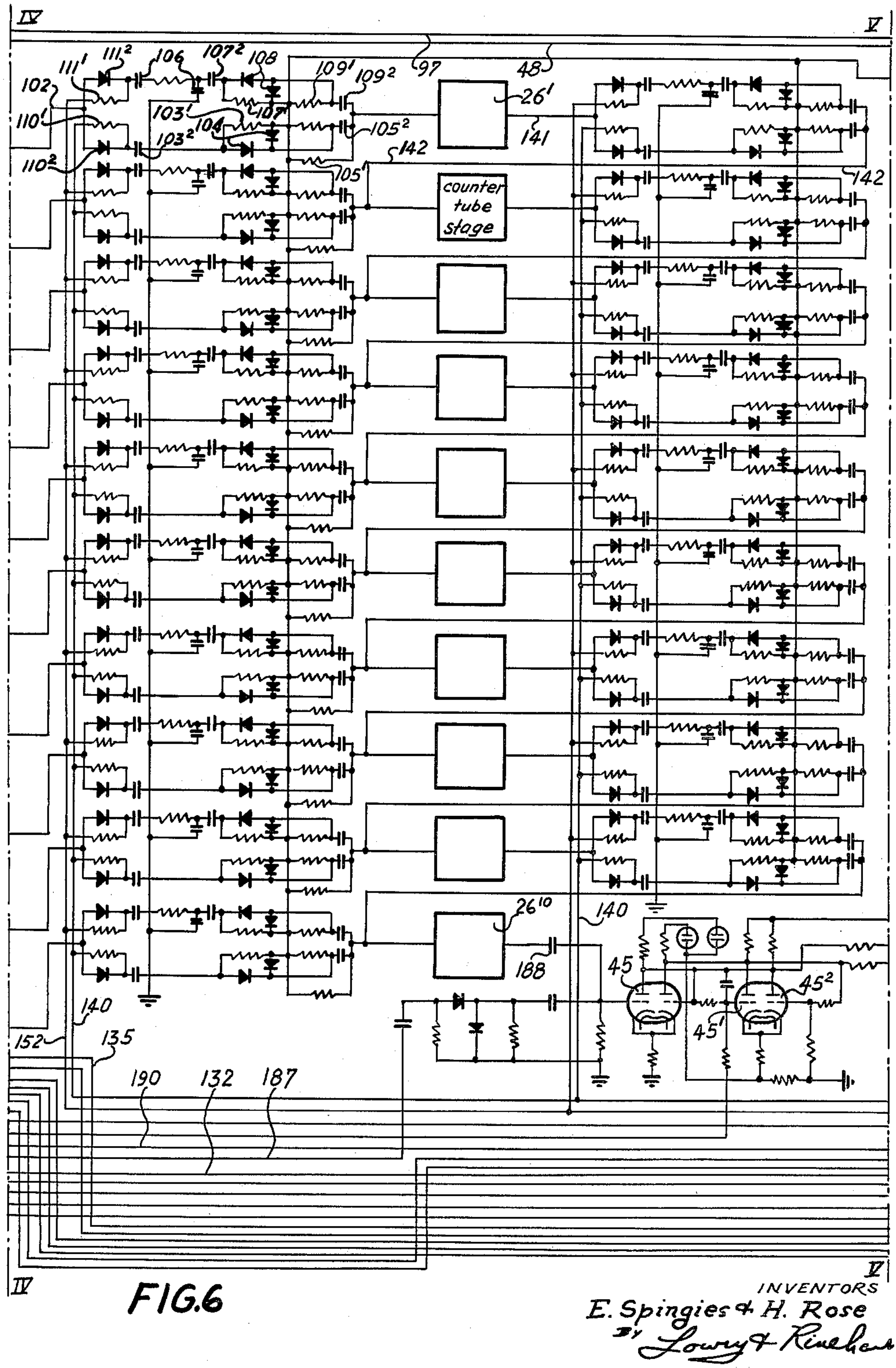
FIG. 6 is a circuit diagram of switch-over means for positive or negative impulses retransmission or tens-transfer.
Figure 9:
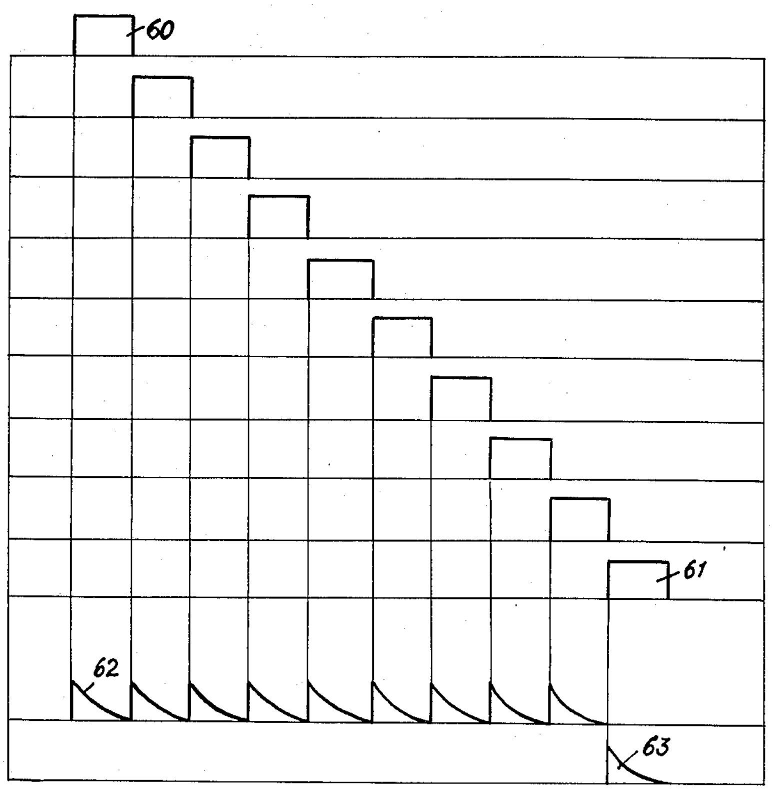
FIG. 9 is a graph illustrating nine calculating impulses produced.

The electrically represented numerical values pass through the input part 11 (FIG. 2) in a manner described supra into the switching mechanisms 25 of the feed-in mechanism 12 (FIG. 3) via relays. The wiper contact arms 24 of the switching mechanisms 25 (FIG. 4) thereby run into their value-determining positions. At the end of the procedure of entering the values, the relay 34 responds which on the one hand causes the tube control 32 (FIG. 7) of the place shifting means 14 (FIG. 5) in the first digit place to respond, and on the other hand transmits a starting control impulse to the univibrator stage $\mathbf{23^1}$ of the impulse transmitter 13 (FIG. 4). As the univibrator stage $\mathbf{23^{10}}$ is blocked during the addition, only one impulse passes through the univibrator stages $\mathbf{23^1}$ to $\mathbf{23^9}$ in the closed circuit arrangement and produces nine counting impulses (FIG. 9). These counting impulses pass via decoupling members 35 and connection points formed by taps 69 on to the wiper contact arms 24 in value position, and then on to the place shifting means 14 (FIG. 5). The impulses are conducted to the impulse forming stages 30 through the opened channels 51. The impulses run into the counter tube stages 26 of the totalizing unit 16 (FIG. 6). The switch-over means 17 of the totalizing unit 16 retransmits in known manner impulses for the tens-transfer to the next higher computing stage. As the values in the counter tube stages $\mathbf{26^1}$ to $\mathbf{26^{10}}$ enter all value places at the same time, the impulse retransmission of the tens-transfer is always effected by a time lag.

The numerical values represented by voltage potentials arrive via input leads $\mathbf{70^1}$ to $\mathbf{70^{10}}$ at the input part 11 (FIGS. 1 and 2) at operating contacts 71 of a relay 72 and at operating contacts 73 of a relay 74. By the command of adding operation a relay 83 is energized via an input lead 87 and begins to operate.

The relay 83 holds via its holding contact, 115, a lead 114 and a contact 97 of a relay 98. By the operation of the relay 83 voltage is applied via its contact 116 and diodes 117 and 118 to the relays 72 and 74. These relays begin to operate and close their operating contacts 71 and 73.

The voltage potentials applied hereto arrive via inoperative make-and-break contacts 75 of the relay 43 and contacts 76 of the relay 57 at one of the two windings of relays $\mathbf{55^1}$ to $\mathbf{55^{10}}$ and at wiper contact arms $\mathbf{78^1}$ to $\mathbf{78^{10}}$ of the selectors $\mathbf{25^1}$ to $\mathbf{25^{10}}$. Applied to contacts 79 of the wiper contact arms $\mathbf{78^1}$ to $\mathbf{78^{10}}$ are the voltage potentials 112 of the source of current 113 (FIG. 3).

Due to the difference in potential at the aforementioned winding of the relays $\mathbf{55^1}$ to $\mathbf{55^{10}}$ contacts $\mathbf{77^1}$ to $\mathbf{77^{10}}$ are closed. As a result voltage arrives at relays $\mathbf{80^1}$ to $\mathbf{80^{10}}$, so that contacts $\mathbf{81^1}$ to $\mathbf{81^{10}}$ close and energize the selectors $\mathbf{25^1}$ to $\mathbf{25^{10}}$. By the operation of the selectors their contact-breaker points $\mathbf{82^1}$ to $\mathbf{82^{10}}$ are opened. Thereby the negative connection of the relays $\mathbf{80^1}$ to $\mathbf{80^{10}}$ is interrupted and the relays release. This causes the separation of the positive voltage via their contacts $\mathbf{81^1}$ to $\mathbf{81^{10}}$ from the selectors $\mathbf{25^1}$ to $\mathbf{25^{10}}$, so that the latter release again.

This step-like operation and release of the selectors $\mathbf{25^1}$ to $\mathbf{25^{10}}$ repeats until the wiper contact arms $\mathbf{78^1}$ to $\mathbf{78^{10}}$ arrive at those contacts 79 the voltage potential of which corresponds to that of the voltage $\mathbf{70^1}$ to $\mathbf{70^{10}}$ put in. The wiper contact arms 78 and 24 and a wiper contact arm 134 are seated on each of selector axles 150. Corresponding to their position the wiper contact arms 24 pick up counting impulses from contacts 139. These contacts are connected to the diode points $\mathbf{49^1}$–$\mathbf{49^9}$ the first contact being connected to the point $\mathbf{49^1}$, the second contact to the point $\mathbf{49^2}$ etc. and the ninth contact to the point $\mathbf{49^9}$. Depending on the position of the individual wiper contact arms 24 the corresponding number of impulses is tapped off from the univibrator stages $\mathbf{23^1}$ to $\mathbf{23^9}$ and is each transmitted via one amplifier valve 96 to the place shifting means via the diodes 28.

The univibrator stages are rendered operative thereby that when the relays $55^1$ to $55^{10}$ are energized voltage is applied via the contacts $77^1$ to $77^{10}$ and diodes $89^1$ to $89^{10}$ to lead 120 and a relay 85 (FIG. 2) at the same time. This relay begins to operate and energizes a condenser 121 via a reversing switch 122 and a rest contact 123 of a relay 124 (FIG. 3).

After the running in of the selectors $25^1$–$25^{10}$ the relays $55^1$ to $55^{10}$ release. This causes the lead 120 to be currentless and the relay 85 releases. The charged condenser 121 delivers its charge through its inoperative contact 122 via a lead 125 and a closed contact 126 of the relay 83 to the relay 34. By the operation of the relay 34 a condenser 127 is energized through a change-over switch 128. At the same time a contact 129, which is adapted to successively operate two contact springs 130 and 131 as sequence contacts, is closed.

Through the closed contacts 129 and 130 voltage is applied to a lead 132 which causes via a diode 133 a switching tube $32^1$ (FIG. 7) of the place shifting means to respond. Thereby a lead 135, which is connected to the resistance 31 (FIG. 5), becomes currentless and opens the path of the impulses to the counter tube stages $26^1$ to $26^{10}$ of the totalizing unit.

By the closing of the contacts 129 and 131 voltage arrives via a lead 136 at resistances 137 (FIG. 4), whereby a voltage potential arrives via a condenser 138 at the grid of the first univibrator stage $23^1$ of the impulse transmitter via a lead 101. In the impulse transmitter nine successive counting impulses are released.

Through the opened path for the impulses of each decimal the impulses arrive via the channels 51 and the condenser 29 belonging thereto, at the impulse forming stage 30. In the impulse forming stage the univibrator impulses are converted into rectangular impulses effecting the control of the counter tube stages $26^1$ to $26^{10}$. In the case of addition the tube stage $33^1$ has responded (FIG. 7), so that a lead 140 is practically dead.

From the impulse forming stage 30 the impulses pass via a lead 102, a diode 110, a differentiating member 103, diodes 104 and coupling members 105 as positive counting impulses to the counter tube stages $26^1$–$26^{10}$ of the totalizing unit.

The tens-transfer after each counter stage of the totalizing unit is unlocked by the lead 140 for the positive tens-transfer. When, during the counting operation in the totalizing unit, one of the counter tube stages spring from 9 to 0, it applies an impulse via its output lead 141, the switch-over means 17, which has the same construction as the switch-over means 15, and a lead 142 to the input of the next following counter tube stage which receives the tens-transfer as additional counting impulse.

The relay 34 is operated only until the condenser 121 has discharged. After release of the relay 34 the charge of the condenser 127 is applied via the contact 128 to a lead 143 and the relay 98 (FIG. 3) is energized. The contact 97 of the relay 98 changes over and causes the relay 124 to respond which applies voltage via its contact 123 to the wiper contact arms 134 of the selectors $25^1$–$25^{10}$. The relay 124 holds itself via a contact 151.

The voltage passes from the wiper contact arms 134 via their contact banks 135, the diodes 136, the lead 137 to the holding contact 138 of the relays 98. By the changing over of the contact 97 the holding lead 114 is switched off and the relay 83 releases. The contact 116 is opened and the relays 72 and 74 release and open their contacts 71 and 73.

The voltages applied to the contact banks 135 pass also to the second winding of the relays $55^1$ to $55^{10}$. These relays begin to operate and effect a step-like rotation of the selectors $25^1$ to $25^{10}$ until each wiper contact arm 134 has left its contact bank 135. Thus the selectors with their wiper contact arms are again in their initial position and the relays 55, 98 and 124 release.

*Subtraction*

In the case of subtraction the procedure of introducing the values corresponds with that for addition. Instead of the relay 34, the relay 36 responds and actuates beside the place shift the tube stage $33^2$ for the switch-over means 15 and 17 (FIG. 7) for negative computation in the totalizing unit 16. The relay 84 is energized via a lead 88. The relay 84 operates in the same manner as the relay 83 described in the case of addition.

The relay 36 controls the tube stage $33^2$ contrary to the relay 34 for the addition. Thereby voltage is applied to the lead 140 and a lead 152 becomes practically dead. Negative counting impulses are applied from the impulse former stages 30 via the lead 102, a diode 111, an integrating member 106, a differentiating member 107, diodes 108 and a coupling member 109 to the counter tube stages $26^1$–$26^{10}$. The switch-over means 17 for the tens-transfer is, for negative impulse transmission, connected via the lead 141, and a lead 142 to the next higher counter tube stage.

*Multiplication*

In the case of multiplication the first factor is entered in a similar manner as in the case of addition, into a part of the switching mechanisms 25 which are now split, no starting control impulse being transmitted to the transmitter 13. The several switching mechanisms 25 shown in the drawings may be split into two parts, for example 25'–$25^5$ and $25^5$–$25^{10}$. The first part input is controlled by the relay 72 and the second part by relay 74 of FIG. 2. The second factor is introduced into the second part of the split switching mechanism 25, at the same time actuating a relay 52 which interrupts connections 53 between the wiper contact arms 24 of the switching mechanism 25 and the place shifting means. The relay 37 controls the feed-in of the first factor, whereas the relay 38 causes the second factor to be entered. The contacts of the relay 38, with the aid of further switching means 54, 57, cause the second factor to enter successively into the switching mechanisms 25, whereby switching means 55 through contacts 77 associated therewith, switch on the tube control 32 of the place shifting means 14 through the place shifting relay 40. In each numerical place of the second factor as many impulses are transmitted to the univibrator stage $23^1$ as correspond to the numerical value of the factor. If a numerical place of the second factor is zero, the corresponding place shift will be skipped via auxiliary relays 56.

As the wiper contact arms 24 have run into positions corresponding to the first factor introduced, the counting impulses are, as described in the case of addition, retransmitted to the totalizing unit 16 by the univibrator stages at each impulse of the numerical values of the second factor.

To facilitate the comprehension of a multiplying operation the example of calculation $12\times43=516$ is described. As in the case of addition voltage potentials corresponding to the numerical values are applied to the input leads $70^1$ to $70^{10}$. In the multiplication the first five input leads $70^1$ to $70^5$ serve for the reception of one factor and the second five input leads $70^6$ to $70^{10}$ for the reception of the other factor. That is to say, for the first factor "12" the voltage potential for the numeral 1 runs into the lead $70^2$ and the voltage potential for the numeral 2 into the lead $70^1$; for the factor "43" the voltage potential for the numeral 3 runs into the lead $70^6$ and the voltage potential for the numeral 4 into the lead $70^7$.

For initiating the multiplication voltage is applied to the incoming circuit 92 which causes the relay 37 to operate. A contact 153 of the relay 37 applies voltage to the relay 72 which closes its contacts 71 and thereby the voltage for the numeral 1 from the lead $70^2$ and the voltage for the numeral 2 from the lead $70^1$ arrive via the operating contacts 71 and the make-and-break contacts 75 of the relay 43 at the first winding of the relay $55^1$ for the numeral 2 and the relay $55^2$ for the numeral 1. The relays $55^1$ and $55^2$ begin to operate since their first winding is via its wiper contact arm $78^1$ or $78^2$ on the zero contact of a selector bank $79^1$ or $79^2$ connected to another voltage potential than their inputs from the leads $70^1$ and $70^2$.

Figure 2:
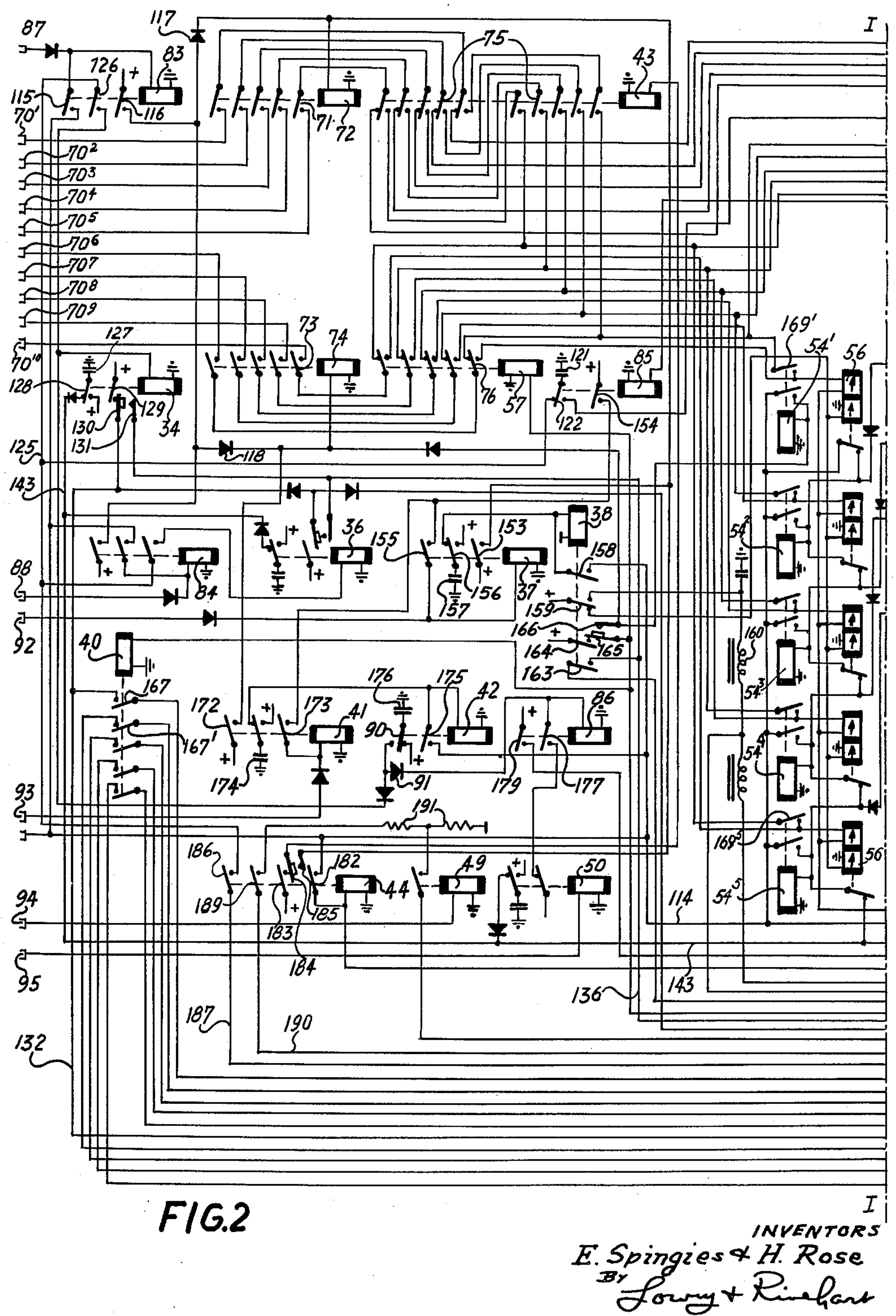
FIG. 2 is a circuit diagram of the input part of the computer.

The now closed contacts $77^1$ and $77^2$ apply voltage via diodes 89 and the lead 120 to the relay 85 shown in FIG. 2 and cause the relay to operate. The closed contact 154 of the relay 85 applies voltage to a holding contact 155 of the relay 37. The contacts $77^1$ and $77^2$ apply voltage also to the relays $80^1$ and $80^2$. The operated relays $80^1$ and $80^2$ apply voltage via their contacts $81^1$ and $82^2$ to the selectors $25^1$ and $25^2$. By the operation of these selectors the selector axles 150 are turned forward through one step and their rest contacts $82^1$ and $82^2$ are interrupted at the same time. Thereby the relays $80^1$ and $80^2$ release and open their contacts $81^1$ and $81^2$ and the selectors $25^1$ and $25^2$ release. After the step of the selector $25^2$, its wiper contact arm $78^2$ has arrived at the first contact having the same voltage potential as the lead $70^2$ for the numeral 1. The selector $25^1$ makes two steps on account of the numeral 2 and its wiper contact arm $78^1$ has thus arrived at the contact having the same voltage potential. Due to the compensation of the voltages of the lead $70^1$ and the contact $79^1$ and the lead $70^2$ and the contact $79^2$, respectively, the relays $55^1$ and $55^2$ release and the introduction of the first factor "12" is finished.

By the release of the relays $55^1$ and $55^2$ the relay 85 is switched off and opens its contact 154. The relay 37 looses its holding voltage thereby and releases.

During the running in of the selectors $25^1$ and $25^2$ a change-over switch 156 of the relay 37 has charged a condenser 157 and connects it to the relay 38 after the release of the relay 37. Voltage is applied to the energized relay 38 through its holding contact 158, the lead 114 and the rest contact 97 of the relay 98 shown in FIG. 3. A make-and-break contact 159 of the relay 38 cuts the voltage off from the holding winding of the relay 56 and connects the voltage via a filter member 160 to the operating contacts 161 of the relays 80 and to make-and-break contacts 171 of the relays 39. The operating contact 163 of the relay 38 prepares the feed path 136 from the contact 161 of the relays 80 to the input of the univibrator wiring.

A contact 164 of the relay 38 is a sequence contact with two successive switching operations. The first switching operation of contacts 164, 165 applies voltage to the relay 57, the relay 40 (FIG. 2) and the relay 52 (FIG. 3). The relay 57 prepares, by its reversing contacts 76, the path of the voltage potentials from the leads $70^6$ to $70^{10}$ for the introduction of the second factor "43." The relay 40 closes contacts 167 and prepares the paths for the place shifting. The relay 52 shown in FIG. 3 switches off the wiper contact arms $24^6$ to $24^{10}$ via the opened contacts 168. The second switching operation of the sequence contact 164, 166 applies voltage to the relay 74 which connects through its operating contacts 73 the voltage potentials from the lead $70^6$ and $70^7$ of the factor "43" via the change-over switches 76 of the relay 57 to a contact $169^1$ of a relay $54^1$ for the numeral 3. The voltage for the numeral 4 runs in the same manner to the contact of the next relay 54.

At the same time the voltage potentials of the leads $70^6$ to $70^{10}$ pass to the first winding of the relays 56 which are with the other end of this winding connected to the voltage potential for the numeral zero. Thereby in the case of the factor "43" the first two relays 56 for units and tens will begin to operate.

By the second switching operation of the sequence contact 164, 166, voltage is applied to the relay $54^1$ which is held through its holding contact, the lead 114 and the rest contact 97 of the relay 98. By the operation of the relay $54^1$ its contact $169^1$ is closed connecting the voltage for the numeral 3 of the factor "43" via the first winding of the relay $55^6$ to the wiper contact arm $78^6$. The relay $55^6$ begins to operate due to the voltage difference between the wiper contact arm $78^6$ and the lead $70^6$ and effects the running in of the selector $25^6$ for the numeral 3 as already described in connection with the first factor.

By the operation of the contact of the relay $55^6$ voltage is applied via the closed operating contact 167 of the relay 40 and the lead 132 to the grid of the first place shifting tube $32^1$. By the energization of the tube $32^1$ the path at the place shifting member is unlocked, as already described in the case of addition. The step-like energization of the relay $80^6$ during the running in of the selector $25^6$ for the numeral 3 causes the step-like closing of a contact 161 which applies impulses via the make-and-break contact 159 of the relay 38, and a closed contact 163 of the relay 38 to the lead 136 to the univibrator.

On each closing of the contact 161 of the relay $80^6$ the univibrator is provoked three times according to the numeral 3, in the case of each provocation one counting operation taking place as in the addition. Thus the first factor "12" is multiplied with the numeral 3 of the second factor "43" by the repetition occurring three times of one addition.

During the operation of the relay $55^6$ its operating contact applies voltage to the relay 39, whereby a condenser 170 is charged via the make-and-break contact 171 by the prepared voltage at the make-and-break contact 159 of the relay 38. After the release of the relay $55^6$ the relay 39 is switched off and the charge of the condenser 170 is delivered via its change-over switch to the next relay $54^2$ which begins to operate and holds via its contact as the relay $54^1$. The operating contact of relay $54^2$ connects the voltage potential of the lead $70^7$ of the numeral 4 of the factor "43" via the first winding of the relay $55^7$ to the wiper contact arm $78^7$. The relay $55^7$ begins to operate due to the voltage difference between the lead $70^7$ and the wiper contact arm $78^7$ and causes the selector $25^7$ to run-in according to the numeral 4 in a step-like manner. At the same time the contact of the relay $55^7$ applies voltage via a contact $167^1$ of the relay 40 to the grid of a second tube $32^2$ (FIG. 7) of the voltage shifting member.

By the energization of the tube $32^2$ the second lead of the place shifting part is unlocked and the impulses oncoming from the univibrator are applied shifted by one numeral place, to the counter tube stages $26^1$–$26^{10}$ as in the case of addition. The relay $55^7$ energizes as the relay $55^6$ via its contact the relay 39 and the condenser 170 is charged applying its charge to the relay $54^3$ on the release of the relay 39. Operation of the relay $55^8$ cannot take place since the voltage potential at the lead $70^8$ is equal to that at the wiper contact arm $78^8$. The cutting-through of the further places of the second factor which are zero is effected by the further relays 56. Whereas the two first relays 56 at the first winding respond due to their voltage difference between the voltage potential for the numeral 0 and the voltage potential for the nuerals of the factor at the leads $70^6$ and $70^7$, the further relays 56 do not respond. The rest contacts of these relays apply the charge of the condenser 170 to the relay 98 which effects the initial position of the selectors 25 and of the relays 38, 54 and 55 as in the case of addition. Therewith the multiplication is finished.

*Division*

The dividend passes over the relay 41 into the switching mechanisms 25 and the totalizing unit 16. The switching mechanisms 25 continue to move into their basic positions and the relay 41 releases. The following series-connected relay 42 now effects the feed-in of the divisor into the switching mechanisms 25, whereby the divisor is, in the example in question, introduced into the switching mechanisms 25 of the five highest value stages by the response of relays 43 (FIGS. 2 and 3).

When the divisor has been introduced, the plate voltage cut-off tube 27 is switched off via the relay 44 and liberates the plate voltage for actuating the flip-flop stages 45, $47^1$ to $47^6$, and moreover the flip-flop stage 45 (FIG. 6) is operated which itself controls both the tube stage 33 of the switch-over means 15, 17, 20, 22, and a switching tube 46. The flip-flop stages $47^1$ to $47^5$ switch on the place shifting means 14, 19, 32. The flip-flop stage $47^6$ switches on the plate-voltage cut-off tube 27 after the division has taken place.

Through the response of the switching tube 46, the univibrator stage $23^{10}$ connected up as gate is opened, with the result that a starting control impulse is transmitted to the univibrator stage $23^1$. Within the closed circuit arrangement the impulse flows through all univibrator stages and thereby transmits via the relays 55 and the wiper contact arms 24 the impulses corresponding to the divisor value to the totalizing means 16 for calculation via the place shifting means 14.

By the univibrator stage $23^{10}$ the highest stage 58 of the quotient counter 21 which positively computes the values is actuated via a lead 48, the place shifting part 19 and the switch-over part 20.

If the electron beam in the highest stage $26^{10}$ of the totalizing unit 16 passes from 0 to 9, the flip-flop stage 45 tips, the switching tube 46 closes the stage $23^{10}$ of the impulse transmitter and switches the tube stage 33 of the switch-over means 15, 17, 20, and 22 on to the reverse manner of counting. Simultaneously with the closing of the stage $23^{10}$ a starting control impulse is transmitted to the univibrator stage $23^1$ of the impulse transmitter which now, with unchanged place shift, transmits the counting impulses corresponding to the divisor value to the totalizing means 16 as positive result and to the quotient counter 21 as negative result. The electron beam of the counter tube stage $26^{10}$ of the highest value place of the totalizing unit 16 now springs from 9 to 0 and causes the flip-flop stage 45 to tip again. As a result the tube stage 33 of the switch-over means 15, 17, 20 and 22 and the switching tube 46 are actuated in the manner above described for opening the stage $23^{10}$. At the same time the flip-flop stage $47^2$ is energized, which in turn switches the corresponding place shifting means 32, 14 and 19. This operation is repeated until the flip-flop stage $47^6$ responds which switches on the plate-voltage cut-off tube 27.

The carrying out of a division is described by the example of calculation $408 \div 12 = 34$.

For the division the input leads $70^1$ to $70^{10}$ are split into two groups, the leads $70^6$ to $70^{10}$ receive the voltage potentials for the numerical values of the dividend and the input leads $70^1$ to $70^5$ the voltage potentials for the numerical values of the divisor. According to the example the lead $70^{10}$ receives the voltage potential of the numeral 4, the lead $70^9$ the voltage potential of the numeral of the numeral 0 and the lead $70^8$ the voltage potential of the numeral 8 of the dividend "408." The input lead $70^5$ receives the voltage potential of the numeral 1 and the input lead $70^4$ the voltage potential of the numeral 2 of the divisor "12."

For initiating the division voltage is applied to the lead 93 causing the relay 41 to operate. A contact 172 of the relay 41 applies voltage to the relay 74. The operating contacts 73 of the relay 74 connect the leads $70^6$ to $70^{10}$ via the change-over switches 76 to the first winding of the relays $55^6$ to $55^{10}$ which begin to operate due to the voltage difference between the input leads $70^6$ to $70^{10}$ and the wiper contact arms $78^6$ to $78^{10}$. Thereby the selector $25^8$ makes eight steps, the selector $25^9$ remains in 0-position and the selector $25^{10}$ makes four steps. Thus the selectors $25^8$ to $25^{10}$ have run in according to the numerals of the dividend "408."

The switching operations of the running in for selecting are already described in the cases of addition and multiplication. During the running in of the selectors 25 the relay 85 receives voltage and applies through its contact 154 holding voltage via a contact 173 to the relay 41. After the running in of the selectors $25^8$ and $25^{10}$ the relay 85 becomes currentless, releases and interrupts the holding voltage via its contact 154, so that the relay 41 releases. A condenser 174, which was charged via the reversing contact of the relay 41, applies, after the release of the relay 41, its charge to the relay 42 which begins to operate. The relay 42 receives voltage via its holding contact 175 and the rest contact 97 of the relay 98 and is held.

Figure 7:
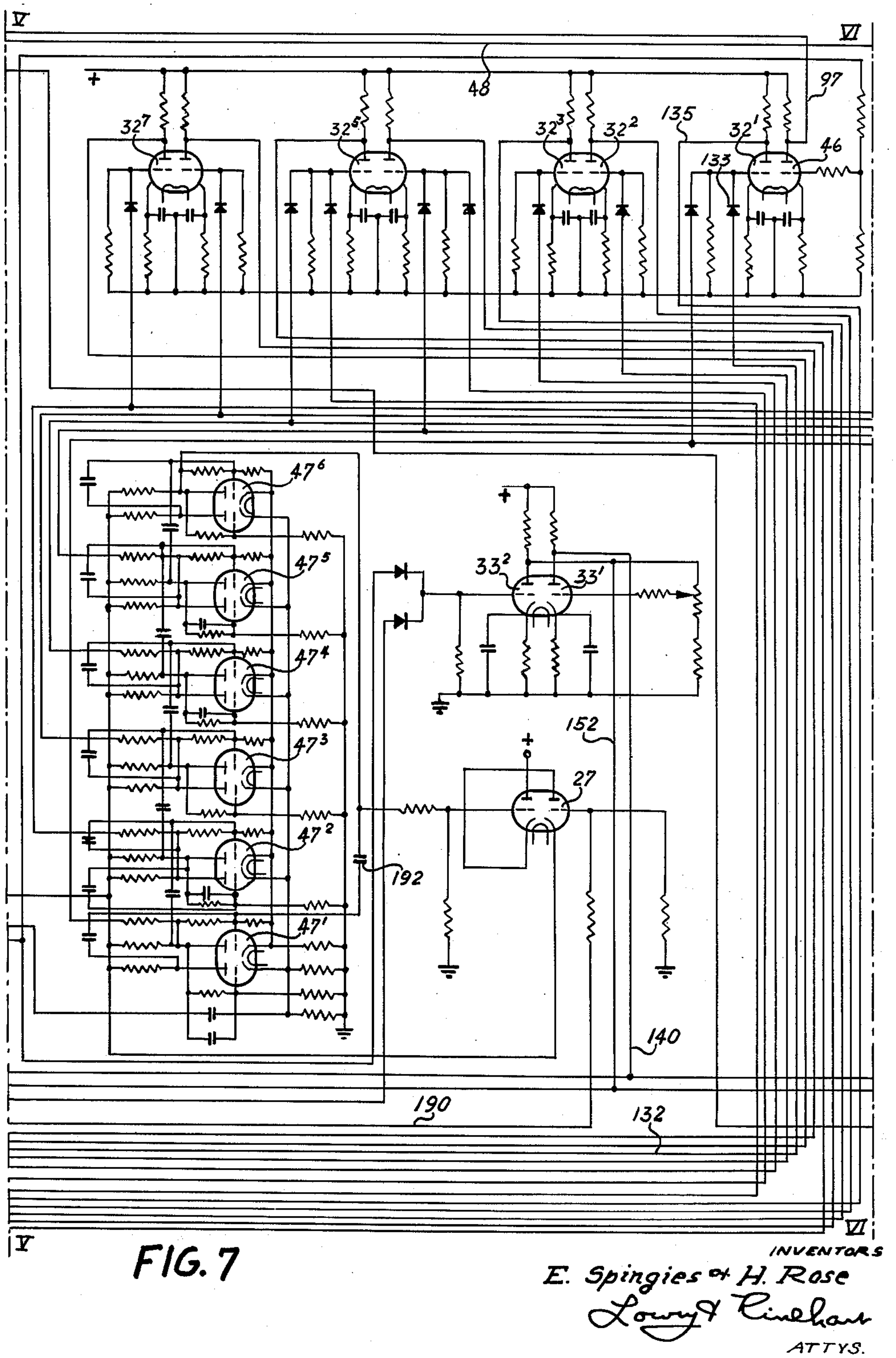
FIG. 7 illustrates a tube arrangement for the place shifting means and the switch-over means.
Figure 8:
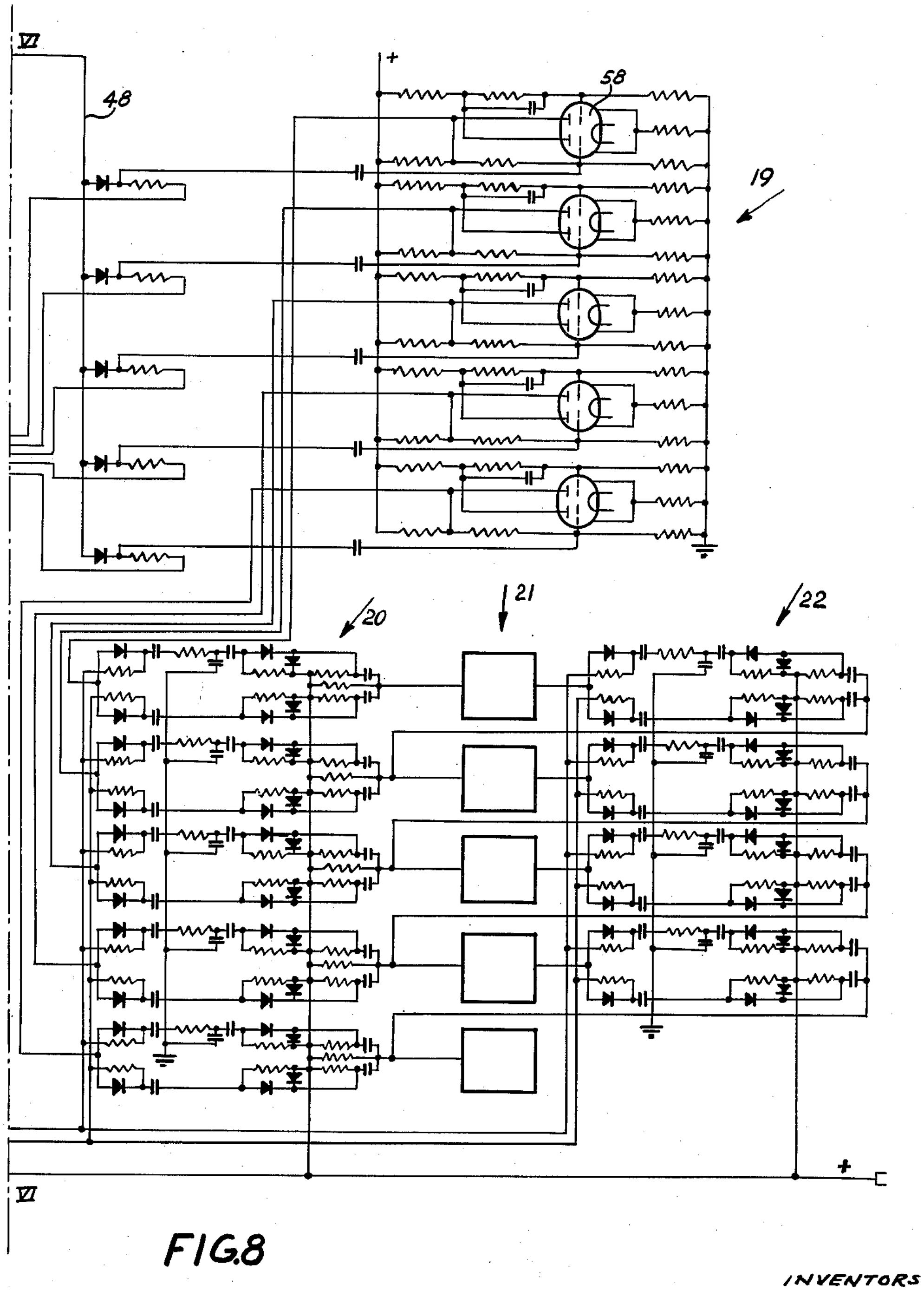
FIG. 8 is a circuit diagram of a quotient counter.

By the operation of the relay 42 a condenser 176 applies its charge via a diode 91 to the relay 86 and also via a diode to the relay 34. The relay 86 receives voltage via its holding contact 177 and a rest contact 178 of the relay 50 and is held. A contact 179 of the relay 86 applies voltage to a make-and-break contact 180 of the relay 98 and prepares the charging of a condenser 181. By the operation of the relay 34 the first switching operation of the sequence contact 129, 130 effects that voltage which is applied to the grid of the first place shifting tube $32^1$ (FIG. 7). The tube energized thereby unlocks the first lead of the place shifting, as described in the case of addition. The second switching operation of the sequence contact 129, 131 applies voltage to the grid of the first univibrator stage (FIG. 4) which is provoked thereby to the production of impulses.

After the running in of the selectors $25^8$ and $25^{10}$ the wiper contact arm $24^8$ picks up eight impulses of the univibrator from its eighth contact and applies them to the counter tube stage $26^8$ and the wiper contact arm $24^{10}$ applies four impulses to the counter tube stage $26^{10}$. Thus the introduction of the dividend "408" into the counter tube stages is finished.

The relay 34 (FIG. 2) is operated by the discharging of the condenser 176 and charges via its change-over switch 128 the condenser 127. After the release of the relay 34 the condenser discharge is continued via the lead 143 to the relay 98 (FIG. 3) and causes the latter to operate. As in the case of addition, the holding voltage of the relay 42 is interrupted by the change-over switch 97 and the relay 42 releases. The change-over switch 97 of the relay 98 applies voltage to the relay 124 which applies voltage to the wiper contact arms 134 through the change-over switch 123. The selectors $25^8$ and $25^{10}$ run in are returned to the initial position, as described in the case of addition. After the reach of the initial position of all selectors the relay 98 releases.

During the operated condition of the relay 98 the condenser 181 is charged via the change-over switch 180 and the closed operating contact 179 of the relay 86 applies, after the release of the relay 98, its charge to the relay 44 (FIG. 2). The relay 44 begins to operate and holds via its contact 182, the lead 114 and the rest contact 97 of the relay 98 (FIG. 3).

Before the tapping of a resistance 191 a closed contact 189 of the relay 44 applies voltage via a lead 190 to the grid of the tube 27 (FIG. 7) and causes the latter to respond. Thereby voltage arrives at the anodes of the flip-flop units $47^1$ to $47^6$. The first stage of the flip-flop unit $47^1$ remains locked and applies control voltage to the grid of the first place shifting tube $32^1$ which then, due to the release of the anode voltage, disconnects the place shifting via the lead 135. All the other flip-flop units $47^2$ to $47^6$ are ignited and cannot energize the corresponding place shifting tubes $32^2$ to $32^7$.

A contact 183 of the relay 44 comprises a sequence contact with two switching operations. The first switching of the sequence contact 183, 184 applies voltage to the relay 43 which preparatorily connects by its contacts 75 the path from the input leads $70^1$ to $70^5$ to the relays $55^6$ to $55^{10}$. The second switching operation of the sequence contact 183, 185 of the relay 44 applies voltage to the relay 72. By the operation of the relay 72 the operating contacts 71 are closed which provide the path from the input leads $70^1$ to $70^5$ via the operating contacts 71 and the make-and-break contacts 75 of the relay 43 to the first winding of the relays $55^6$ to $55^{10}$.

Applied to the leads $70^5$ and $70^4$ are the voltages for the divisor "12" according to the example. Thereby the selector $25^{10}$ makes one step according to the numeral 1 and the selector $25^9$ two steps according to the numeral 2 of the divisor. Due to the running in the relays $55^{10}$ and $55^9$ apply voltage through their contacts $77^{10}$ and $77^9$ to the relay 85. By the energization of the relay 85 the condenser 121 is charged via the contact 123 of the relay 124.

After the running in of the selectors 25 the relay 85 releases and the condenser applies its charge via the change-over switch 122, a closed operating contact 186 of the relay 44 and a lead 187 to the input of the flip-flop stage 45 (FIG. 6).

Thereby the flip-flop stage $45^1$ is switched off and the flip-flop stage $45^2$ switched on. The raised voltage passes for control from the anode of the stage $45^1$ to the reversing stage $33^2$, so that the lead 152 becomes practically dead and the lead 140 receives a raised potential. As already described, the switching means 15 and 17 are prepared for the negative calculation and the switch-over parts 20 and 22 of the quotient counter 21 for the positive calculation. At the same time voltage is applied through the flip-flop stage $45^1$ to the switching tube 46, whereby the lead 97 becomes practically dead. Thereby the univibrator stage $23^{10}$ is opened and starts via a condenser 100, the lead 101 and the diode 102 the univibrator stage $23^1$. For the division "408" : "12" the univibrator is provoked until the successive subtraction of the numeral 12 from the numeral 40 (8) results in a negative value. Herein the counter tube stage $26^{10}$ is caused to spring from the numeral 0 to the numeral 9. Due to this springing of the counter tube stage $26^{10}$ same transmits an impulse via a condenser 188 to the flip-flop stage 45, the impulse changing over the stages $45^1$ and $45^2$ in such a manner that the reversing stage 33 is switched to positive counting in the switch-over parts 20 and 22. At the same time the tube 46 is changed over, so that the lead 97 receives higher voltage potential and the univibrator stage $23^{10}$ is closed as in the case of addition.

By this voltage leap in the lead 97 the first univibrator stage $23^1$ is once started via the condenser 100 and the diode 102. The impulses of the univibrator produced thereby are used for the positive counting of the divisor 12 which was deducted once too much during the first dividing operation. The counter tube $26^{10}$ springs from 9 back to 0 and applies an impulse via the condenser 188 to the flip-flop stage 45 which then again prepares the negative counting. It repeats the same operation as after the first energization of the flip-flop stage 45 by the discharge of the condenser 188. In this case the impulse emanating from the flip-flop stage $45^1$ does not pass to the flip-flop unit $47^1$ (FIG. 7), but to the flip-flop unit $47^2$ which then permits the further place shifting tube $32^7$ to respond and thereby unlocks the second path of the place shifting (FIG. 5). All further negatively connected counting impulses arrive at the counter tube stages $26^1$–$26^{10}$ by one lower numerical place.

The individual starting impulses of the univibrator are counted, as place shifted in the quotient counter 21, the negative passages are counted positively and the positive passages negatively. Thereby the quotient 34 results in the quotient counter.

After the reach of the last flip-flop unit $47^6$ voltage is applied to the grid of the tube 27 which then cuts off the plate voltage.

At the same time voltage is applied via a condenser 192 to the grid of the second flip-flop stage of the first flip-flop unit $47^1$ which then connects to the initial position.

Therewith the division is finished.

In FIG. 9 impulses 60 are shown which are produced by the anodes of the first nine univibrator stages $23^1$ to $23^9$. These impulses are retransmitted after differentiation as counting impulses 62 to the place shifting means 14. An impulse 61 is, after differentiation, transmitted by the univibrator stage $23^{10}$ to the quotient counter 21 as counting impulse 63.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description and all changes which come within the meaning and range of equivalency of the claims are therefore intended to be embraced therein.

We claim:

1. An electronic digital computer operating in the decimal system for connection to standard office accounting equipment, said computer comprising a pulse transmitter having a plurality of serially connected univibrators, the last univibrator of said series being connected to the first univibrator of said series to reinitiate the generation of pulses by said series, the last univibrator of said series being so arranged that the connection between said last and said first univibrators of said series may be selectively interrupted, said transmitter having outputs from which individual pulse trains representative of numerical values may be received, step switching means connected to the outputs of said pulse transmitter and adapted to be selectively set to positions representative of numerical values, said step switching means each including contacts at each of said positions and a movable wiper arm, each of said contacts being connected to an output of said transmitter from which pulse trains representing the same numerical value is received, input means for receiving external potential signals representative of input numerical values from external sources, said input means controlling the positions of the wiper arm with respect to the contacts of each of said step switching means in accordance with the potential signals representative of numerical information supplied to the computer, said input means including means for balancing said input potentials with standard potentials, pulse forming means connected to said wiper arms for reforming the pulse outputs from said transmitter, counter means connected to the output of said pulse forming means for counting the pulses supplied thereto from said pulse transmitter through said step switching means, and computer control means for initiating the operation of said pulse transmitter upon the entry of information to the computer, first switching means in said control means responsive to the operation of said step switching means for selecting the numerical denomination of said counter means to which pulses from said pulse forming means are transmitted, said counter means having carry means effective when the capacity of any denomination counter stage has been reached to transfer a count to the next higher denomination counter stage, relay means in said control means to selectively control repetitive operation of said pulse transmitter and repeated transmission of pulses from said pulse formers to said counter means to perform multiplication by repeated addition, means in said control means for selectively transmitting negative counting pulses from said pulse forming means to said counter means for performing subtraction, and means in said control means for counting the number of repeated subtractions of a divisor necessary to reduce a dividend to zero.

2. The computer defined in claim 1 wherein said transmitter outputs include decoupling members connected between the outputs from said univibrators and said step switching means, said decoupling members comprising a chain of diodes connected in series and having taps between individual links of the chain of diodes, each of said taps serving as means for providing individual trains of pulses each of which trains represents an input value to be calculated, and wherein said counter means comprises a first group of counters and a second group of counters, said first group receiving the dividend and said second group receiving the quotient as it is computed, means for entering the dividend and the divisor into said step switching means in sequence, and means for causing the transfer of the dividend from said step switching means to said first group of counters in response to a pulse from said transmitter, the divisor remaining in said step switching means and the second group receiving from the transmitter pulses representative of the value of the quotient as said division operation proceeds.

References Cited in the file of this patent

UNITED STATES PATENTS

| | | |
|---|---|---|
| 2,346,616 | Saxby | Apr. 11, 1944 |
| 2,442,428 | Mumma | June 1, 1948 |
| 2,575,331 | Compton et al. | Nov. 20, 1951 |
| 2,580,740 | Dickinson | Jan. 1, 1952 |
| 2,817,477 | Williams | Dec. 24, 1957 |
| 2,932,450 | Knight et al. | Apr. 12, 1960 |